United States Patent
Takayama et al.

(10) Patent No.: US 11,512,432 B2
(45) Date of Patent: *Nov. 29, 2022

(54) OXIDIZED MICROFIBRILLATED CELLULOSE FIBERS AND COMPOSITION THEREOF

(71) Applicant: NIPPON PAPER INDUSTRIES CO., LTD., Tokyo (JP)

(72) Inventors: Masato Takayama, Tokyo (JP); Yoshihiro Aoki, Tokyo (JP); Takanori Otsuhata, Tokyo (JP); Takeo Izumiya, Tokyo (JP); Hiroyuki Okumura, Tokyo (JP); Tomonori Kawamata, Tokyo (JP); Ryo Sotooka, Tokyo (JP)

(73) Assignee: NIPPON PAPER INDUSTRIES CO., LTD., Tokyo (JP)

( * ) Notice: Subject to any disclaimer, the term of this patent is extended or adjusted under 35 U.S.C. 154(b) by 30 days.

This patent is subject to a terminal disclaimer.

(21) Appl. No.: 17/042,302

(22) PCT Filed: Mar. 28, 2019

(86) PCT No.: PCT/JP2019/013635
§ 371 (c)(1),
(2) Date: Dec. 18, 2020

(87) PCT Pub. No.: WO2019/189593
PCT Pub. Date: Oct. 3, 2019

(65) Prior Publication Data
US 2021/0131036 A1    May 6, 2021

(30) Foreign Application Priority Data

Mar. 30, 2018   (JP) .............................. JP2018-070268

(51) Int. Cl.
*D21H 11/20* (2006.01)
*D21H 15/02* (2006.01)
*C08B 11/12* (2006.01)
*D21H 17/67* (2006.01)

(52) U.S. Cl.
CPC .............. *D21H 11/20* (2013.01); *C08B 11/12* (2013.01); *D21H 15/02* (2013.01); *D21H 17/67* (2013.01); *D10B 2201/00* (2013.01); *D10B 2401/16* (2013.01)

(58) Field of Classification Search
CPC ......... C08B 15/04; C08B 11/12; C08B 15/02; D21H 17/67; D21H 11/20; D21H 11/18; D21H 15/02; D21H 17/25; D10B 2201/00; D10B 2401/16
USPC .......................................................... 162/9
See application file for complete search history.

(56) References Cited

U.S. PATENT DOCUMENTS

| | | | |
|---|---|---|---|
| 2016/0289894 A1 | 10/2016 | Kajanto et al. | |
| 2021/0115160 A1* | 4/2021 | Takayama | D21H 11/20 |
| 2021/0131037 A1* | 5/2021 | Takayama | D21C 9/002 |
| 2021/0238313 A1* | 8/2021 | Takayama | D21H 15/02 |

FOREIGN PATENT DOCUMENTS

| | | |
|---|---|---|
| CA | 2999970 A1 | 4/2017 |
| EP | 3127868 A1 | 2/2017 |
| JP | 10-251301 A | 9/1998 |
| JP | 2002-194691 A | 7/2002 |
| JP | 2002-536507 A | 10/2002 |
| JP | 2013-531749 A | 8/2013 |
| JP | 2016-223042 A | 12/2016 |
| JP | 2017-110085 A | 6/2017 |
| JP | 2017-141531 A | 8/2017 |
| JP | 2017-155364 A | 9/2017 |
| WO | 2000/47628 A2 | 8/2000 |
| WO | 2012/007363 A1 | 1/2012 |
| WO | 2014/087767 A1 | 6/2014 |
| WO | 2014/088072 A1 | 6/2014 |
| WO | 2017/014255 A1 | 1/2017 |
| WO | 2017/179740 A1 | 10/2017 |
| WO | 2018/003492 A1 | 1/2018 |
| WO | 2018/011669 A1 | 1/2018 |

OTHER PUBLICATIONS

Gondo et al., JP 2016-223042, machine translation, Date: Dec. 2016.*
U.S. Appl. No. 17/043,168, filed Dec. 21, 2020, 2021-0131037, Published.
U.S. Appl. No. 17/043,376, filed Sep. 29, 2020, 2021-0115160, Published.
U.S. Appl. No. 17/042,310, filed Dec. 9, 2020, 2021-0238313, Published.
U.S. Appl. No. 17/043,168, filed Sep. 29, 2020, Pending.
U.S. Appl. No. 17/043,376, filed Sep. 29, 2020, Pending.
U.S. Appl. No. 17/042,310, filed Sep. 28, 2020, Pending.
International Search Report and Written Opinion for Application No. PCT/JP2019/013627, dated May 28, 2019, 15 pages.
International Search Report and Written Opinion for Application No. PCT/JP2019/013630, dated May 28, 2019, 15 pages.
International Search Report and Written Opinion for Application No. PCT/JP2019/013635, dated May 28, 2019, 14 pages.
International Search Report and Written Opinion for Application No. PCT/JP2019/013641, dated May 28, 2019, 14 pages.

* cited by examiner

*Primary Examiner* — Mark Halpern
(74) *Attorney, Agent, or Firm* — McCarter & English, LLP; Steven G. Davis; Wei Song

(57) ABSTRACT

Provided is an oxidized microfibrillated cellulose fiber having a Canada standard freeness of not less than 200 mL and an average fiber diameter of not less than 500 nm. Said fiber enhances paper strength when added to a paper.

8 Claims, No Drawings

OXIDIZED MICROFIBRILLATED CELLULOSE FIBERS AND COMPOSITION THEREOF

CROSS-REFERENCE TO RELATED APPLICATIONS

This application is a U.S. national stage filing, under 35 U.S.C. § 371(c), of International Application No. PCT/JP2019/013635, filed on Mar. 28, 2019, which, in turn, claims priority to Japanese Patent Application No. 2018-070268, filed on Mar. 30, 2018.

TECHNICAL FIELD

The present invention relates to an oxidized microfibrillated cellulose fiber and a composition comprising said fiber.

BACKGROUND ART

During a papermaking process, a composition prepared by dispersing a pulp and a pigment in water is used. The water retention ability of such a composition is important from the viewpoints of increased efficiency of production process and improvement of product quality. For example, when a base paper is made using a pulp slurry as a raw material, the water retention ability of the pulp slurry has a great impact on the water drainage of the slurry on a wire screen and the dispersibility of the pulp, and as a consequence on the paper strength, air resistance and bulkiness of a produced paper. Further, the degree of penetration of a binder into a base paper varies depending on the water retention ability of a pigment coating liquid, and thus, the water retention ability of a pigment coating liquid has a great impact on the strength and adhesiveness of a pigment coated layer and a base paper. In recent years, many studies have been actively conducted on cellulose nanofibers made using cellulose as a raw material. For example, PTL 1 discloses a technique related to a composition comprising a cellulose nanofiber.

CITATION LIST

Patent Literature

PTL 1: Japanese Unexamined Patent Application Publication No. JP 2017-110085

SUMMARY OF INVENTION

Technical Problem

The present inventors conceived an idea that if an attempt is made to enhance the water retention ability of a composition by using a microfibrillated cellulose fiber with a lower degree of defibration than cellulose nanofibers, said fiber is more likely to remain in papers, whereby papers with increased strength can be produced with low cost. However, no study of such an idea has been conducted yet. In light of these circumstances, an object of the present invention is to provide a microfibrillated cellulose fiber that enhances the water retention ability of a composition and exerts an effect to enhance paper strength when added to a paper.

Solution to Problem

The present inventors found that oxidized microfibrillated cellulose fibers with a particular level of freeness can achieve the aforementioned object. Therefore, the aforementioned object is achieved by the following invention.

(1) An oxidized microfibrillated cellulose fiber having a Canada standard freeness of not less than 200 mL and an average fiber diameter of not less than 500 nm.
(2) The oxidized microfibrillated cellulose fiber as set forth in (1), having an electrical conductivity of not more than 500 mS/m, as measured at pH 8 in the form of a 1% by weight solids concentration water dispersion.
(3) The oxidized microfibrillated cellulose fiber as set forth in (1) or (2), having a carboxyl group content of from 0.1 to 3.0 mmol/g.
(4) The oxidized microfibrillated cellulose fiber as set forth in any of (1) to (3), having a cellulose type-I crystallinity of not less than 50%.
(5) A composition comprising the oxidized microfibrillated cellulose fiber as set forth in any of (1) to (4) and water.
(6) The composition as set forth in (5), further comprising a raw material pulp.
(7) The composition as set forth in (5) or (6), further comprising a binder.
(8) The composition as set forth in any of (5) to (7), further comprising a white pigment.
(9) A dry solid formed by drying the composition as set forth in any of (5) to (8).
(10) A method of preparing the oxidized microfibrillated cellulose fiber as set forth in any of (1) to (4), the method comprising the steps of:
(A) oxidizing a pulp,
(B) wet-grinding the pulp.

Advantageous Effects of Invention

According to the present invention, there can be provided a microfibrillated cellulose fiber that enhances the water retention ability of a composition and exerts an effect to enhance paper strength when added to a paper.

DESCRIPTION OF EMBODIMENTS

The present invention provides an oxidized microfibrillated cellulose fiber having a Canada standard freeness of not less than 200 mL and an average fiber diameter of not less than 500 nm. In this invention, ranges "from X to Y" include both endpoints X and Y.

1. Oxidized Microfibrillated Cellulose Fiber (1) Oxidized Microfibrillated Cellulose Fiber Microfibrillated cellulose (hereinafter also referred to as "MFC") fibers refer to fibers having an average fiber diameter (also referred to as "average fiber width") of not less than 500 nm, which are obtained by fibrillating a cellulose-based raw material such as pulp. Oxidized microfibrillated cellulose (hereinafter also referred to as "oxidized MFC") fibers refer to a MFC obtained by fibrillating an oxidized cellulose-based raw material. In this invention, the average fiber diameter refers to a length-weighted average fiber diameter, which can be determined by an image analysis-based fiber analyzer, such as a fiber tester produced by ABB Japan K.K. or a fractionator produced by Valmet K.K. For example, the MFC is obtained by relatively gently defibrating or beating a cellulose-based raw material using a beater, disperser or the like. Therefore, the MFC has a larger fiber diameter than cellulose nanofibers obtained by intensely defibrating a cellulose-based raw material by a high pressure homogenizer or the like, and has a structure in which the fiber surface is efficiently fluffed (externally fibrillated) while the fiber itself is left not microfiberized (internally fibrillated).

The oxidized MFC of the present invention is preferably a mechanically-treated, oxidized microfibrillated cellulose fiber (hereinafter also referred to as "mechanically-treated, oxidized MFC") obtained by subjecting a pulp to chemical modification (oxidation) followed by further mechanical treatment such as defibration. In other words, since the oxidized MFC of this invention is obtained by relatively gently defibrating or beating an oxidized cellulose-based raw material, strong hydrogen bonding present between fibers is weakened by chemical modification. Thus, as compared to a MFC obtained simply by mechanical defibration or beating, the mechanically-treated, oxidized MFC is characterized in that the fibers are easier to ravel, less damaged, and internally and externally fibrillated in a moderate manner. Further, a water dispersion obtained by dispersing the oxidized MFC of this invention in water has high hydrophilicity, high water retention ability, and high viscosity.

As mentioned above, the MFC differs in degree of fibrillation from a cellulose-based raw material. It is generally not easy to quantify a degree of fibrillation, but the present inventors found that the degree of fibrillation of a MFC can be quantified based on its Canada standard freeness, water retention value, and transparency.

The oxidized MFC of the present invention has a carboxyl group, which is an anionic group introduced thereto, and thus the physical properties of the oxidized MFC, including affinity for water, vary depending on the type of carboxyl groups, i.e., whether the carboxyl groups are of acid type (H-type) or of salt type (Na-type). The properties of the oxidized MFC can vary since the type of carboxyl groups is adjusted as appropriate depending on the intended use. Unless otherwise stated, the fiber properties of the oxidized MFC of this invention are evaluated based on the measurements obtained for an oxidized MFC which provides an alkaline water dispersion, or more specifically a water dispersion with 1% by weight concentration at pH 8. Since the oxidized MFC, unlike common pulp, has anionic substituents introduced thereto, said MFC can advantageously be used as an additive such as dispersant or coagulant, taking advantage of its anionic characteristics.

<Canada Standard Freeness>

The Canada standard freeness of the oxidized MFC of the present invention, as measured so as to ensure that the aforementioned requirements are met, is not less than 200 mL, preferably not less than 250 mL. The upper limit of the freeness is not limited but is preferably not more than 900 mL. The Canada standard freeness of the oxidized MFC of this invention can be adjusted by adjusting the degrees of processing into short fibers, micronization and fibrillation during treatment of an oxidized pulp used as a raw material. In general, Canada standard freeness is used as an index for the freeness (water drainage) of a pulp slurry. In this invention, it was found that when a cellulose fiber has high water retention ability but is heavily processed into short fibers, said fiber passes through a net mesh, resulting in an increase in Canada standard freeness. Thus, the present inventors had made intensive studies and as a result, found that when an oxidized pulp is processed into short fibers simultaneously with micronization and fibrillation, the pulp shows an increase in Canada standard freeness while having high water retention ability. In other words, a Canada standard freeness of not less than 200 mL is attributable to the fact that an oxidized pulp is highly processed into short fibers. Since the oxidized MFC of this invention is highly fibrillated, said MFC itself has high water retention value and can enhance the water retention ability of a composition. Therefore, when the oxidized MFC of this invention is used, for example, as a papermaking additive, said MFC is more likely to remain in a paper during a papermaking step, leading to efficient enhancement of paper strength.

<Water Retention Value>

The water retention value of the oxidized MFC of the present invention is preferably not less than 300%, more preferably not less than 350%. When the water retention value is less than 300%, the effect of this invention, which is enhancing the water retention ability of a composition comprising the oxidized MFC of this invention, may not be fully obtained. Water retention value is determined according to JIS P-8228:2018.

<Transparency in the Form of Water Dispersion>

The oxidized MFC of the present invention is characterized by having low transparency when made into the form of a water dispersion prepared using water as a dispersion medium. In this invention, the transparency refers to the transmittance of light at a wavelength of 660 nm through a 1% (w/v) solids concentration water dispersion of a material of interest (e.g., oxidized MFC). The specific method of determining transparency is as described below.

A dispersion of the oxidized MFC (solids concentration: 1% (w/v), dispersing medium: water) is prepared and determined for transmittance of light at 660 nm using the UV-VIS spectrophotometer UV-1800 (produced by Shimadzu Corporation) equipped with rectangular cells with an optical path length of 10 mm.

In the present invention, the transparency of the oxidized MFC is preferably not more than 40%, more preferably not more than 30%, still more preferably not more than 20%, yet more preferably not more than 10%. In general, the transparency of a cellulose-based material increases when the material is nanosized while it retains its crystallinity. In contrast, the oxidized MFC of this invention has a low level of transparency because said MFC is not so much highly nanosized and retains its fiber structure. When the oxidized MFC having a transparency of not more than 40% is internally incorporated into a paper, the oxidized MFC retains its fiber structure in the paper, thereby reducing the occurrence of a decline in paper thickness or paper density and enabling enhancement of paper strength without deterioration of rigidity.

<Electrical Conductivity>

The electrical conductivity of the oxidized MFC of the present invention is preferably not more than 500 mS/m, more preferably not more than 300 mS/m, still more preferably not more than 200 mS/m, yet more preferably not more than 100 mS/m, most preferably 70 mS/m, as measured under the condition of pH 8 in the form of a 1.0% by weight water dispersion. The lower limit of the electrical conductivity is preferably not less than 5 mS/m, more preferably not less than 10 mS/m. The electrical conductivity of the oxidized MFC is higher than that of an oxidized cellulose-based material used as a raw material. An electrical conductivity exceeding the upper limit means that the concentration of metal and inorganic salts dissolved in a water dispersion of an oxidized cellulose-based material is above a specified value. When the concentration of metal and inorganic salts is low, electrostatic repulsion can easily occur between fibers, promoting efficient fibrillation.

Hereunder, a method of preparing an oxidized MFC will be described.

1) Cellulose-Based Raw Material

Examples of cellulose-based raw materials include, but are not particularly limited to, cellulose-based raw materials derived from plants, animals (e.g., sea squirt), algae, microorganisms (e.g., *Acetobacter*), and microorganism products. Examples of cellulose-based raw materials derived from plants include wood, bamboo, hemp, jute, kenaf, farm waste products, cloth, and pulps (e.g., softwood (nadelholz) unbleached kraft pulp (NUKP), softwood bleached kraft pulp (NBKP), hardwood (laubholz) unbleached kraft pulp (LUKP), hardwood bleached kraft pulp (LBKP), softwood unbleached sulfite pulp (NUSP), softwood bleached sulfite pulp (NBSP), thermomechanical pulp (TMP), softwood dissolving pulp, hardwood dissolving pulp, recycled pulp, waste paper). Also, a cellulose powder obtained by grinding such a cellulose-based raw material as mentioned above may be used. The cellulose raw material used in the present invention can be any or a combination of the aforementioned materials, but is preferably a cellulose fiber derived from a plant or microorganism, more preferably a cellulose fiber derived from a plant, still more preferably a wood-based pulp, most preferably a softwood pulp.

The average fiber diameter of a cellulose fiber is not particularly limited. Commonly used softwood kraft pulps have an average fiber diameter of about from 30 to 60 μm, and hardwood kraft pulps have an average fiber diameter of about from 10 to 30 μm. Other pulps after a common purification procedure have an average fiber diameter of about 50 μm. For example, in the case of using a raw material obtained through purification of a several centimeter-sized material such as chip, it is preferable to subject the raw material to mechanical treatment by a disintegrator such as refiner or beater to adjust average fiber diameter to not more than about 50 μm, more preferably not more than about 30 μm.

2) Oxidization

By oxidizing a cellulose raw material, an oxidized cellulose is obtained. The method of oxidizing a cellulose raw material is not particularly limited. One exemplary method is to oxidize a cellulose raw material in water using an oxidizing agent in the presence of an N-oxyl compound and a substance selected from the group consisting of bromides, iodides and mixtures thereof. According to this method, primary hydroxyl groups at C6 position of glucopyranose rings found on the surface of cellulose fibers are selectively oxidized to produce groups selected from the groups consisting of aldehyde groups, carboxyl groups, and carboxylate groups. The concentration of a cellulose raw material during the oxidation reaction is not particularly limited, but is preferably not more than 5% by weight.

The N-oxyl compound refers to a compound capable of producing nitroxyl radicals. Examples of nitroxyl radicals include 2,2,6,6-tetramethylpiperidine-1-oxyl (TEMPO). Any N-oxyl compound can be used as long as it is a compound capable of promoting a desired oxidation reaction. The amount of an N-oxyl compound used is not particularly limited as long as it is a catalyst amount that allows oxidation of cellulose as a raw material. For example, the amount of an N-oxyl compound used is preferably not less than 0.01 mmol, more preferably not less than 0.02 mmol, per 1 g of absolute dry cellulose. The upper limit of this amount is preferably not more than 10 mmol, more preferably not more than 1 mmol, still more preferably not more than 0.5 mmol. Therefore, the amount of an N-oxyl compound used is in the range of preferably from 0.01 to 10 mmol, more preferably from 0.01 to 1 mmol, still more preferably from 0.02 to 0.5 mmol, per 1 g of absolute dry cellulose.

Bromides refer to compounds containing bromine, and examples thereof include alkali metal bromides which are able to dissociate and ionize in water, such as sodium bromide. Iodides refer to compounds containing iodine, and examples thereof include alkali metal iodides. The amount of a bromide or an iodide used can be selected within a range that can promote an oxidation reaction. The total amount of a bromide and an iodide is preferably not less than 0.1 mmol, more preferably not less than 0.5 mmol, per 1 g of absolute dry cellulose. The upper limit of this amount is preferably not more than 100 mmol, more preferably not more than 10 mmol, still more preferably not more than 5 mmol. Therefore, the total amount of a bromide and an iodide is in the range of preferably from 0.1 to 100 mmol, more preferably from 0.1 to 10 mmol, still more preferably from 0.5 to 5 mmol, per 1 g of absolute dry cellulose.

Examples of an oxidizing agent include, but are not particularly limited to, halogens, hypohalous acids, halous acids, perhalic acids, salts thereof, halogen oxides, and peroxides. Inter alia, preferred because of low cost and low environmental impact are hypohalous acids or salts thereof, more preferably hypochlorous acid or a salt thereof, still more preferably sodium hypochlorite. The amount of an oxidizing agent used is preferably not less than 0.5 mmol, more preferably not less than 1 mmol, still more preferably not less than 3 mmol, per 1 g of absolute dry cellulose. The upper limit of this amount is preferably not more than 500 mmol, more preferably not more than 50 mmol, still more preferably not more than 25 mmol. Therefore, the amount of an oxidizing agent used is in the range of preferably from 0.5 to 500 mmol, more preferably from 0.5 to 50 mmol, still more preferably from 1 to 25 mmol, particularly preferably from 3 to 10 mmol, per 1 g of absolute dry cellulose. When an N-oxyl compound is used, the amount of an oxidizing agent used is preferably not less than 1 mol per 1 mol of the N-oxyl compound, and the upper limit of this amount is preferably 40 mol. Therefore, the amount of an oxidizing agent used is preferably in the range of from 1 to 40 mol per 1 mol of the N-oxyl compound.

The conditions for an oxidation reaction, such as pH and temperature, are not particularly limited, and the oxidation reaction generally progresses efficiently even under relatively mild conditions. The reaction temperature is preferably not less than 4° C., more preferably not less than 15° C. The upper limit of the temperature is preferably not more than 40° C., more preferably not more than 30° C. Therefore, the reaction temperature is in the range of preferably from 4 to 40° C., or about from 15 to 30° C., or namely may be room temperatures. The pH of a reaction solution is preferably not less than 8, more preferably not less than 10. The upper limit of the pH is preferably not more than 12, more preferably not more than 11. Therefore, the pH of a reaction solution is in the range of preferably from 8 to 12, more preferably about from 10 to 11. Since carboxyl groups are generally produced in cellulose during the progress of an oxidation reaction, the pH of a reaction solution tends to drop. Therefore, in order to allow an oxidation reaction to progress efficiently, it is preferred to add an alkaline solution such as aqueous sodium hydroxide solution to maintain the pH of a reaction solution within the aforementioned range. The reaction medium used for oxidation is preferably water because of its ease of handling and unlikeliness to cause a side reaction.

The reaction time for oxidation can be determined as appropriate according to the state of progress of the oxidation reaction, and is generally not less than 0.5 hour. The upper limit of this reaction time is generally not more than 6 hours, preferably not more than 4 hours. Therefore, the reaction time for oxidation is generally in the range of from 0.5 to 6 hours, for example about from 0.5 to 4 hours. The oxidation reaction may be performed in two or more divided stages. For example, when an oxidized cellulose obtained by filtration after the completion of the first reaction stage is oxidized again under the same or different reaction conditions, the cellulose can be oxidized efficiently without being interfered with by a salt produced as a byproduct during the first reaction stage.

Another example of the carboxylation (oxidation) method is ozone oxidation. According to this oxidation reaction method, not only hydroxyl groups located at least at C2 and C6 positions of glucopyranose rings constituting cellulose are oxidized, but also degradation of cellulose chains take place. The ozone treatment is generally performed by bringing a cellulose raw material into contact with an ozone-containing air. The ozone concentration in the air is preferably not less than 50 g/m$^3$. The upper limit of the ozone concentration is preferably not more than 250 g/m$^3$, more preferably not more than 220 g/m$^3$. Therefore, the ozone concentration in the air is in the range of preferably from 50 to 250 g/m$^3$, more preferably from 50 to 220 g/m$^3$. The amount of ozone added is preferably not less than 0.1% by weight, more preferably not less than 5% by weight, based on 100% by solid weight of a cellulose raw material. The upper limit of this amount is generally not more than 30% by weight. Therefore, the amount of ozone added is in the range of preferably from 0.1 to 30% by weight, more preferably from 5 to 30% by weight, based on 100% by solid weight of a cellulose raw material. The ozone treatment temperature is generally not less than 0° C., preferably not less than 20° C., and the upper limit of this temperature is generally not more than 50° C. Therefore, the ozone treatment temperature is in the range of preferably from 0 to 50° C., more preferably from 20 to 50° C. The ozone treatment time is generally not less than 1 minute, preferably not less than 30 minutes, and the upper limit of the ozone treatment time is generally not more than 360 minutes. Therefore, the ozone treatment time is generally in the range of about from 1 to 360 minutes, preferably about from 30 to 360 minutes. When the conditions for ozone treatment fall within the aforementioned ranges, cellulose can be prevented from being excessively oxidized and degraded, resulting in a satisfactory yield of an oxidized cellulose.

Ozone-treated cellulose may be further subjected to additional oxidation treatment with an oxidizing agent. The oxidizing agent used for additional oxidation treatment is not particularly limited, and examples thereof include chlorine-based compounds such as chlorine dioxide and sodium chlorite, oxygen, hydrogen peroxide, persulfuric acid, and peracetic acid. An exemplary method of performing additional oxidation treatment is a method in which such an oxidizing agent is dissolved in water or a polar organic solvent such as alcohol to prepare a solution of the oxidizing agent and a cellulose raw material is immersed in the oxidizing agent solution. The contents of carboxyl groups, carboxylate groups and aldehyde groups in an oxidized MFC can be adjusted by controlling the oxidation conditions, such as the amount of an oxidizing agent added and reaction time.

An exemplary method of determining carboxyl group content is described below. 60 mL of a 0.5% by weight slurry (water dispersion) of an oxidized cellulose is prepared, adjusted to pH 2.5 by adding a 0.1 M aqueous hydrochloric acid solution, and then measured for electrical conductivity while a 0.05 N aqueous sodium hydroxide solution is added dropwise until the pH reaches 11. The carboxyl group content can be calculated according to the following equation, based on the amount (a) of sodium hydroxide consumed during the stage of neutralization with weak acid where the electrical conductivity changes slowly.

Carboxyl group content [mmol/g oxidized cellulose]=$a$[mL]×0.05/mass of oxidized cellulose[g]

The carboxyl group content in an oxidized cellulose, as determined in such a manner, is preferably not less than 0.1 mmol/g, more preferably not less than 0.5 mmol/g, still more preferably not less than 0.8 mmol/g, based on absolute dry weight. The upper limit of this content is preferably not more than 3.0 mmol/g, more preferably less than 2.5 mmol/g, still more preferably not more than 2.0 mmol/g. Therefore, said carboxyl group content is preferably from 0.1 to 3.0 mmol/g, more preferably not less than 0.1 and less than 2.5 mmol/g, still more preferably not less than 0.5 and less than 2.5 mmol/g, yet more preferably from 0.8 to 2.0 mmol/g.

<Cellulose Type-I Crystallinity>

With regard to the cellulose crystallinity of the oxidized MFC of the present invention, type-I crystals are preferably present at a concentration of not less than 50%, more preferably not less than 60%, still more preferably not less than 65%. By adjusting crystallinity within the aforementioned range, the oxidized MFC can exhibit different effects, including imparting water retention properties, when added to a paper. Further, when type-I crystals are present at a concentration of not less than 50% in an oxidized pulp as a raw material, the pulp can be efficiently fibrillated by beating or defibrating treatment while it retains its fiber structure, whereby the oxidized MFC of this invention can be prepared efficiently.

The method of determining the cellulose type-I crystallinity of an oxidized MFC is as described below.

A sample is placed into a glass cell and subjected to measurement using an X-ray diffractometer (LabX XRD-6000, produced by Shimadzu Corporation). The calculation of crystallinity is performed by a method such as Segal—the crystallinity is calculated according to the following equation based on the diffraction strength of plane (002) at 2θ=22.6° and the diffraction strength of amorphous region at 2θ=18.5°, with the diffraction strength at 2θ=10° to 30° in an X-ray diffraction diagram being used as a baseline.

$Xc=(I_{002c}-I_a)/I_{002c}\times100$ $Xc$: Cellulose type-I crystallinity (%)
$I_{002c}$: Diffraction strength of plane (002) at 2θ=22.6°
$I_a$: Diffraction strength of amorphous region at 2θ=18.5°.

3) Mechanical Treatment

At this step, an oxidized pulp is mechanically defibrated, beaten or disintegrated to an average fiber diameter of not less than 500 nm. Mechanical defibration, beating or disintegration is referred to as "mechanical treatment", and defibrating or beating an oxidized pulp dispersed in water is referred to as "wet-grinding". Mechanical treatment may be performed once, or may be performed two or more times by repeating the same procedure or combining different procedures. In the case of performing mechanical treatment two or more times, different procedures may be performed at any given timing, and the apparatus to be used may be the same or different. This step can be performed, for example, by any of the following procedures.

the water dispersion of an oxidized pulp is concentrated to high concentration (not less than 20% by weight) by dehydration or the like, and then subjected to defibration or beating;

the water dispersion of an oxidized pulp is diluted to reduce concentration (less than 20% by weight, preferably not more than 10% by weight), and then subjected to mechanical treatment such as beating or defibration;

the oxidized pulp is subjected to drying, followed by mechanical defibration, disintegration or beating;

the oxidized pulp is subjected to preliminary dry-grinding into short fibers, followed by mechanical defibration, disintegration or beating.

Since the pulp is moderately fibrillated and processed into short fibers in the present invention, it is preferable to perform mechanical treatment twice or so. It is preferred that a high-concentrated water dispersion of an oxidized pulp should be first treated using a refiner or a high-speed disintegrator and then a low-concentrated water dispersion of the oxidized pulp should be treated using a refiner or a high-speed disintegrator.

The apparatus used for mechanical treatment is not particularly limited, and examples thereof include different types of apparatus, such as high-speed rotating type, colloid mill type, high pressure type, roll mill type, and ultrasonic type. Specific examples thereof that can be used include some types of apparatus which perform mechanical treatment by causing a metal or blade moving around the axis of rotation on pulp fibers, and other types of apparatus which perform mechanical treatment by means of the friction between pulp fibers, as exemplified by high-pressure or ultrahigh-pressure homogenizer, refiner, beater, PFI mill, kneader, disperser, and high-speed disintegrator.

In the case of defibrating or beating an oxidized pulp dispersed in water, the lower limit of the solids concentration of the oxidized pulp in the water dispersion is generally preferably not less than 0.1% by weight, more preferably not less than 0.2% by weight, still more preferably not less than 0.3% by weight. At such a solids concentration, the relative amount of a dispersion medium to the amount of the oxidized pulp becomes appropriate, leading to greater efficiency. The upper limit of this concentration is generally preferably not more than 50% by weight.

At this step, an oxidized MFC is obtained. The average fiber diameter of an oxidized MFC is not less than 500 nm, preferably not less than 1 μm, more preferably not less than 10 μm, in terms of length-weighted average fiber diameter. The upper limit of the average fiber diameter is preferably not more than 60 μm, more preferably not more than 40 μm. The average fiber length of an oxidized MFC is preferably not less than 50 μm, more preferably not less than 100 μm, still more preferably not less than 200 μm, in terms of length-weighted average fiber length. The upper limit of the average fiber length is preferably not more than 3000 μm, more preferably not more than 1000 μm, still more preferably not more than 500 μm, most preferably not more than 400 μm. When a previously oxidized pulp is used as a raw material, said pulp is easily fibrillated when subjected to mechanical treatment. In the case of a common pulp, the Canada standard freeness decreases with the progress of fibrillation. However, in the present invention, a raw material pulp is highly processed into short fibers with adjustments being made to the concentration of the raw material to be mechanically treated and the type of an apparatus to be used, whereby there can be obtained an oxidized MFC having high Canada standard freeness while maintaining high water retention ability.

Length-weighted average fiber diameter and length-weighted average fiber length can be determined using an image analysis-based fiber analyzer, such as a fiber tester produced by ABB Japan K.K. or a fractionator produced by Valmet K.K. The average aspect ratio of an oxidized MFC is preferably not less than 5, more preferably not less than 10. The upper limit of the average aspect ratio is not particularly limited, and is preferably not more than 1000, more preferably not more than 100, still more preferably not more than 80, most preferably not more than 50. The average aspect ratio can be calculated according to the following equation.

$$\text{Average aspect ratio} = \text{average fiber length/average fiber diameter}$$

It is preferable that the carboxyl group content of the oxidized MFC obtained at this step should be the same as that of an oxidized pulp used as a raw material.

2. Composition

The composition of the present invention comprises an oxidized MFC and water. The composition of this invention, which comprises an oxidized MFC and water as mentioned above, can be used for a wide variety of applications that require water retention. The composition of this invention can be used to serve as, for example, a thickener, a gellant, a shape retainer, an emulsion stabilizer, or a dispersion stabilizer. To be specific, the composition of this invention can be used in papermaking raw materials (additive, raw material pulp), food products, cosmetics, pharmaceuticals, agricultural chemicals, toiletries, sprays, paints, and the like. However, it is preferred that the composition of this invention should be used, in a paper production process, as a paper raw material (pulp slurry) for use at a papermaking step or as a pigment coating liquid or clear coating liquid for use at a coating step. Thus, these applications are described below for instance.

(1) Pulp Slurry

A pulp slurry comprises not only an oxidized MFC and water, but also a raw material pulp. The raw material pulp refers to a pulp that serves as a main component of a paper. The pulp raw material for a base paper used in the present invention is not particularly limited, and examples thereof that can be used include: mechanical pulps such as ground pulp (GP), thermomechanical pulp (TMP) and chemithermomechanical pulp (CTMP); waste paper pulps such as deinked pulp (DIP) and undeinked pulp; and chemical pulps such as nadelholz (softwood) kraft pulp (NKP) and laubholz (hardwood) kraft pulp (LKP). As waste paper pulps, use can be made of those pulps derived from sorted waste papers such as high-quality paper, medium-quality paper, low-quality paper, newspaper waste paper, leaflet waste paper, magazine waste paper, corrugated paper, and printed waste paper, or those pulps derived from unsorted waste papers comprising a mixture of different waste papers.

The content of an oxidized MFC in a pulp slurry is preferably $1 \times 10^{-4}$ to 20% by weight, more preferably $1 \times 10^{-3}$ to 5% by weight, based on the amount of a raw material pulp. If this content exceeds its upper limit, the water retention ability of the pulp slurry will become too high, possibly causing poor water drainage at a papermaking step. If this content falls below its lower limit, enhancement of water retention ability or enhancement of the paper strength of a paper made with addition of an oxidized MFC may not be achieved due to too small an amount of the oxidized MFC added.

The pulp slurry may contain a known filler. Examples of fillers include: inorganic fillers such as heavy calcium carbonate, light calcium carbonate, clay, silica, light calcium carbonate-silica composite, kaolin, fired kaolin, delaminated kaolin, magnesium carbonate, barium carbonate, barium sulfate, aluminum hydroxide, calcium hydroxide, magnesium hydroxide, zinc hydroxide, zinc oxide, titanium oxide, and amorphous silica produced by neutralizing sodium silicate with a mineral acid; and organic fillers such as urea-formalin resin, melamine resin, polystyrene resin and phenol resin. Such fillers may be used alone or in combination. Among them, preferred is heavy calcium carbonate or light calcium carbonate, which are representative fillers used to make neutral and alkaline papers and can give papers high opacity. The content of a filler is in the range of preferably from 5 to 20% by weight based on the amount of a raw material pulp. In the present invention, it is more preferred that the content of a filler should be not less than 10% by weight, since the decline in paper strength can be reduced even when paper ash content is high.

The oxidized MFC of the present invention can function as a paper strengthening agent or a yield improver in a pulp slurry. In addition to the MFC of this invention, various wet end additives, including bulking agent, dry paper strengthening agent, wet paper strengthening agent, freeness improver, dye, or cationic, nonionic or anionic sizing agent, may be added to a pulp slurry depending on the need.

The pulp slurry of the present invention is prepared by any given method, but it is preferable to add the oxidized MFC at the step of subjecting a raw material pulp to refining or mixing treatment. When the oxidized MFC is added at a mixing step, a mixture prepared beforehand by mixing the oxidized MFC with a filler and other auxiliary agents such as yield improver may be added to a raw material pulp slurry.

The solids concentration of a pulp slurry is adjusted as appropriate depending on papermaking conditions and the like, but is preferably in the range of from 0.1 to 1.0% by weight. Such a pulp slurry is made into a paper by a known papermaking method. Papermaking can be carried out using, for example, but not limited to, a fourdrinier paper machine, a gap former-type paper machine, a hybrid former-type paper machine, an on-top former-type paper machine, or a cylinder paper machine.

(2) Clear Coating Liquid

The clear coating liquid is a coating liquid composed mainly of a water-soluble polymer commonly used as a surface treating agent, including starch (e.g., oxidized starch, modified starch, dextrin), carboxymethylcellulose, polyacrylamide, or polyvinyl alcohol. In addition to the water-soluble polymer, various additives such as water resisting agent, external sizing agent, surface strengthening agent, dye or pigment, fluorescent colorant, and water retainer may be contained in a clear coating liquid. The water-soluble polymer can also serve as a binder.

The content of an oxidized MFC in a clear coating liquid is not particularly limited. Total solids content may consist of an oxidized MFC, but from viewpoints of coating suitability and the like, it is preferred to use an oxidized MFC in admixture with the aforementioned water-soluble polymer. The mixing ratio of water-soluble polymer and oxidized MFC is in the range of preferably from 1:10000 to 10000:1, more preferably about from about 1:1 to 500:1.

By coating one or both sides of a base paper with a clear coating liquid by a known method, a clear coating layer can be formed. In the present invention, the term "clear coating" refers to coating or impregnating a base paper with a clear coating liquid using a coater such as size press, gate roll coater, premetered size press, curtain coater, or spray coater. The coating amount of a clear coating layer is in the range of preferably from 0.1 to 1.0 $g/m^2$, more preferably from 0.2 to 0.8 $g/m^2$, in terms of solids per one side.

(3) Pigment Coating Liquid

The pigment coating liquid is a composition comprising a white pigment as a main component. Examples of a white pigment include commonly used pigments such as calcium carbonate, kaolin, clay, fired kaolin, amorphous silica, zinc oxide, aluminum oxide, satin white, aluminum silicate, magnesium silicate, magnesium carbonate, titanium oxide, and plastic pigments.

The content of an oxidized MFC in a pigment coating liquid is preferably in the range of $1\times10^{-3}$ to 1 part by weight based on 100 parts by weight of a white pigment. When this content falls within the aforementioned range, there can be obtained a pigment coating liquid without showing a significant increase in viscosity.

The pigment coating liquid contains a binder. Examples of a binder include, but are not limited to: different types of starches, such as oxidized starch, cationic starch, urea-phosphoric acid esterified starch, etherified starch (e.g., hydroxyethyl etherified starch), and dextrin; different types of proteins, such as casein, soybean protein, and synthetic protein; polyvinyl alcohol; cellulose derivatives such as carboxymethyl cellulose and methyl cellulose; conjugated diene polymer latexes, such as styrene-butadiene copolymer and methyl methacrylate-butadiene copolymer; acrylic polymer latexes; and vinyl polymer latexes such as ethylene-vinyl acetate copolymer. Such binders may be used alone, or two or more thereof may be used in combination. It is preferable to use a starch-based binder and a styrene-butadiene copolymer in combination.

The pigment coating liquid may contain different auxiliary agents commonly used in the field of paper production, such as dispersant, thickener, antifoamer, colorant, antistatic agent, or antiseptic agent.

By coating one or both sides of a base paper with a pigment coating liquid by a known method, a pigment coating layer can be formed. From the viewpoint of coating suitability, the solids concentration of a pigment coating liquid is preferably in the range of about from 30 to 70% by weight. One, two or three or more pigment coating layers may be formed. When there are two or more pigment coating layers, it is only necessary that any one of the layers should be formed with a pigment coating liquid comprising an oxidized MFC. The coating amount of a pigment coating layer is adjusted as appropriate depending on the intended use, but in the case of production of a coated paper for printing, said coating amount is not less than 5 $g/m^2$, preferably not less than 10 $g/m^2$, per one side in total. The upper limit of this coating amount is preferably not more than 30 $g/m^2$, more preferably not more than 25 $g/m^2$.

(4) Dry Solid

The composition of the present invention can be dried into a dry solid. In particular, a dry solid (base paper, clear coating layer, pigment coating layer) obtained by drying a water dispersion comprising a raw material pulp, a water-soluble polymer, a white pigment or the oxidized MFC of this invention has both strength and pliableness. The reason for this is not known but is presumed to be as follows. Since a water dispersion of the oxidized MFC of this invention is defibrated in a gentler manner than a CNF which is defibrated to the single-nanometer level, the oxidized MFC of this invention is dispersed in water while it has a fibrillated surface but retains its fiber structure. Therefore, a dry solid obtained by drying such a water dispersion contains a fiber network which is reinforced by hydrogen bonds formed between fibrillated fibers, and thus combines strength and pliableness. Said dry solid can be used as a composition when water is added thereto.

3. Paper Comprising an Oxidized MFC

A paper made from a pulp slurry comprising the oxidized MFC of the present invention has high paper strength and high air resistance. Also, a paper having a pigment coating layer or clear coating layer formed from a pigment coating liquid or clear coating liquid comprising the inventive oxidized MFC shows a reduced degree of penetration of a binder into a base paper, and thus has high coating layer strength and high air resistance. Further, a paper made from a pulp slurry comprising the inventive oxidized MFC is characterized by having high bulkiness.

A paper comprising the oxidized MFC of the present invention preferably has a base weight of from 10 to 400 $g/m^2$, more preferably from 15 to 100 $g/m^2$. A base paper used to produce a paper comprising the oxidized MFC of this invention may be composed of a single layer or of multiple layers. A paper made from a pulp slurry comprising the oxidized MFC has a base paper layer comprising the oxidized MFC. When the paper has multiple base paper layers, it is only necessary that at least any one of these layers should comprise the oxidized MFC. Further, the ash content of said paper varies with the presence or absence of a pigment coating layer, but this ash content is preferably in the range of from 0 to 30% for a paper having no pigment coating layer (i.e., base paper or clear coated paper), and in the range of from 10 to 50% for a paper having a pigment coating layer.

A paper comprising the oxidized MFC may have a clear coating layer depending on the need. Also, a paper comprising the oxidized MFC may be subjected to surface treatment or other treatments by a known method.

EXAMPLES

Hereunder, the present invention will be described by way of examples. Analysis of physical properties was performed according to the following procedures.

Average fiber length, average fiber diameter: A 0.2% by weight slurry was prepared by adding ion exchange water to a sample and determined for these properties using a fractionator produced by Valmet K. K.

Canada standard freeness (c.s.f.): This property was determined according to JIS P 8121-2:2012.

Electrical conductivity: A water dispersion with a sample (e.g., oxidized MFC) concentration of 1.0% by weight was prepared and determined for electrical conductivity at pH 8 using a portable electrical conductivity meter produced by Horiba Ltd.

Bulk thickness and bulk density: These properties were determined according to JIS P 8223:2006.

Specific tensile strength: This property was determined according to JIS P 8223:2006.

Short-span specific tensile strength: This property was determined according to JIS P 8156:2012.

Ring crush specific tensile strength: This property was determined according to JIS P 8126:2005.

Air resistance: This property was determined according to JIS P 8117:2009 using an Oken air resistance-smoothness tester.

Comparative Example A1

First, 5.00 g (absolute dry) of a bleached, unbeaten kraft pulp (whiteness: 85%) derived from softwood was added to 500 mL of an aqueous solution of 39 mg (0.05 mmol per g of absolute dry cellulose) of TEMPO (produced by Sigma Aldrich) and 514 mg (1.0 mmol per g of absolute dry cellulose) of sodium bromide, and stirring was continued until the pulp was uniformly dispersed. To the reaction system, an aqueous solution of sodium hypochlorite was added to a sodium hypochlorite concentration of 5.0 mmol/g to initiate oxidation reaction. In order to avoid a decrease in the pH of the system during the reaction, a 3 M aqueous sodium hydroxide solution was sequentially added to adjust pH to 10. The reaction was terminated once sodium hypochlorite had been consumed so that the pH of the system no longer changed. The mixture after the reaction was filtered through a glass filter to separate a pulp, which was fully washed with water to give an oxidized pulp (carboxylated cellulose). Thus, a TEMPO-oxidized pulp with a carboxyl group content of 1.4 mmol/g was prepared.

Example A1

The TEMPO-oxidized pulp prepared in Comparative Example A1 was dispersed in water to form a 30% by weight water dispersion, which was treated in a single-disc refiner (product name: 14 Inch Labo Refiner, produced by Aikawa Iron Works Co., Ltd.). Then, the treated water dispersion was diluted into a 4% by weight dispersion, which was treated in a high-speed disintegrator (product name: TopFiner, produced by Aikawa Iron Works Co., Ltd.) to obtain an oxidized MFC of Example A1.

Example A2

An oxidized MFC of Example A2 was obtained by the same procedure as in Example A1, except that the second treatment was carried out using the aforementioned refiner.

Example A3

An oxidized MFC of Example A3 was obtained by the same procedure as in Example A1, except that the dispersion subjected to the first treatment was a 4% by weight dispersion.

Comparative Example A3

A non-oxidized pulp (NBKP, produced by Nippon Paper Industries Co., Ltd.) was dispersed in water to form a 4% by weight dispersion, which was treated in the aforementioned refiner. Then, the treated dispersion was diluted into a 4% by weight dispersion, which was treated in the aforementioned high-speed disintegrator to obtain a NBKP pulp of Comparative Example A3. The physical properties of this pulp are shown in Table 1. In this table, the NBKP used as a raw material to produce the NBKP of Comparative Example A3 is denoted as Comparative Example A2.

Example B1

96% by weight of a corrugated waste paper (produced by Nippon Paper Industries Co., Ltd.) and 4% by weight of the oxidized MFC (<10 mL c.s.f.) prepared in Example A1 were mixed to give a mixed pulp with a solids concentration of 0.8% by weight. Based on the total amount of the mixed pulp, 1.0% by weight of aluminum sulfate, 0.15% by weight of polyacrylamide, and 0.2% by weight of a sizing agent were added to prepare a stock. The prepared pulp slurry was used to make a handmade sheet with an aim to achieve a base weight of 100 g/m$^2$, and the handmade sheet was subjected to analysis. The handmade sheet was made according to JIS P 8222.

Examples B2 to B3

Handmade sheets were made and analyzed by the same procedure as in Example B1, except for using the oxidized MFC obtained in Example A2 or A3.

Comparative Examples B1, B2

Handmade sheets were made and analyzed by the same procedure as in Example B1, except that no oxidized MFC was used. The corrugated waste paper used in Comparative Example B1 was of the same lot as that used in Example B1, and the corrugated waste paper used in Comparative Example B2 was of the same lot as that used in Comparative Example B3.

Comparative Example B3

A handmade sheet was made and analyzed by the same procedure as in Example B1, except that the pulp obtained in Comparative Example A3 was used instead of an oxidized MFC. The physical properties of this handmade sheet are shown in Table 2.

TABLE 1

| | | Com. Ex. A1 | Ex. A1 | Ex. A2 | Ex. A3 | Com. Ex. A2 | Com. Ex. A3 |
|---|---|---|---|---|---|---|---|
| Type | Pulp | TOP-Na | TOP-H | TOP-H | TOP-H | NBKP | NBKP |
| | COOH group content | 1.4 mmol/g | 1.4 mmol/g | 1.4 mmol/g | 1.4 mmol/g | | |
| Average fiber length | mm | 1.74 | 0.35 | 0.27 | 0.30 | 1.72 | 1.76 |
| Average fiber diameter | μm | 17.5 | 15.1 | 12.5 | 14.3 | 16.6 | 16.8 |
| CSF | ml | 148 | 862 | 836 | ≥850 | 620 | 420 |
| Electrical conductivity | mS/m | 50 | 61 | 60 | 83 | 5 | 12 |

TABLE 2

| | | Com. Ex. B1 | Ex. B1 | Ex. B2 | Ex. B3 | Com. Ex. B2 | Com. Ex. B3 |
|---|---|---|---|---|---|---|---|
| Raw material | Type | Corrugated waste paper | | | | | |
| | Added amount % | 100 | 96 | 96 | 96 | 100 | 96 |
| MFC | Type | — | Ex. A1 | Ex. A2 | Ex. A3 | — | Com. Ex. A3 |
| | Added amount % | 0 | 4 | 4 | 4 | 0 | 4 |
| Bulk thickness | mm | 0.161 | 0.156 | 0.153 | 0.155 | 0.163 | 0.159 |
| Bulk density | g/cm$^3$ | 0.63 | 0.66 | 0.67 | 0.67 | 0.62 | 0.64 |
| Specific tensile strength | N · m/g | 39.6 | 43.1 | 44.7 | 43.5 | 39.6 | 41.6 |
| Ring crush specific tensile strength | N · m$^2$/g | 177 | 191 | 194 | 188 | 178 | 178 |
| Short-span specific tensile strength | kN · m/kg | 23.9 | 26.3 | 26.8 | 25.3 | 23.7 | 24.2 |
| Air resistance (Oken) | sec | 25 | 68 | 77 | 74 | 25 | 29 |

It is apparent that the paper of the present invention has excellent paper strength and air resistance.

The invention claimed is:

1. An oxidized microfibrillated cellulose fiber having a Canada standard freeness of not less than 200 mL, an average fiber diameter of not less than 500 nm, an average fiber length of not more than 500 μm, and a water retention value of not less than 300%.

2. The oxidized microfibrillated cellulose fiber according to claim 1, wherein the electrical conductivity is between 10 and 100 mS/m, as measured at pH 8 in the form of a 1% by weight solids concentration water dispersion.

3. The oxidized microfibrillated cellulose fiber according to claim 2, having a carboxyl group content of 0.1 to 3.0 mmol/g.

4. The oxidized microfibrillated cellulose fiber according to claim 3, having a cellulose type-I crystallinity of not less than 50%.

5. The oxidized microfibrillated cellulose fiber according to claim 1, having carboxyl group content of 0.1 to 3.0 mmol/g.

6. The oxidized microfibrillated cellulose fiber according to claim 1, having a cellulose type-I crystallinity of not less than 50%.

7. The oxidized microfibrillated cellulose fiber according to claim 1, wherein the water retention value of not less than 350%.

8. The oxidized microfibrillated cellulose fiber according to claim 1, wherein the electrical conductivity is between 10 and 70 mS/m, as measured at pH 8 in the form of a 1% by weight solids concentration water dispersion.

* * * * *